UNITED STATES PATENT OFFICE.

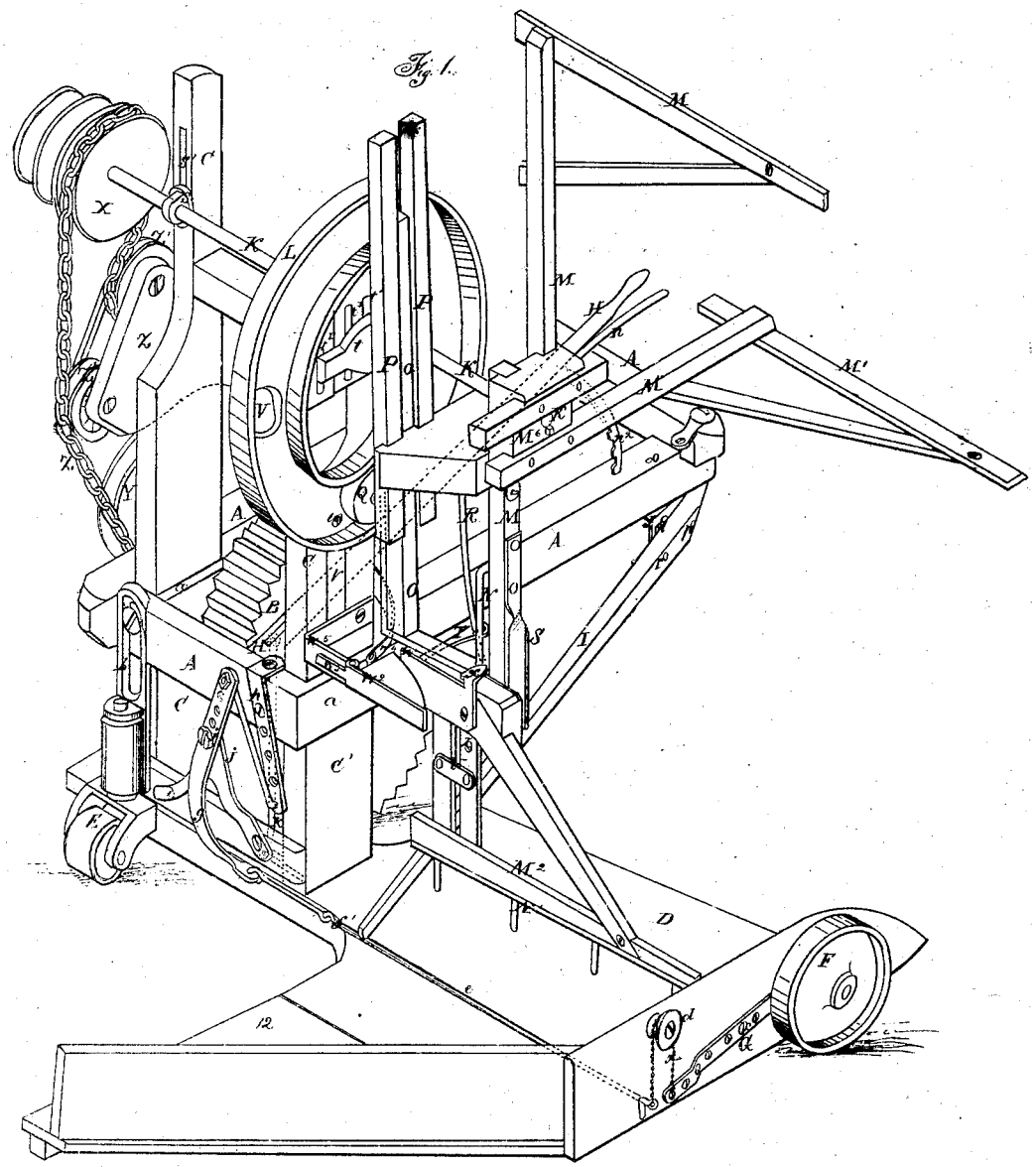

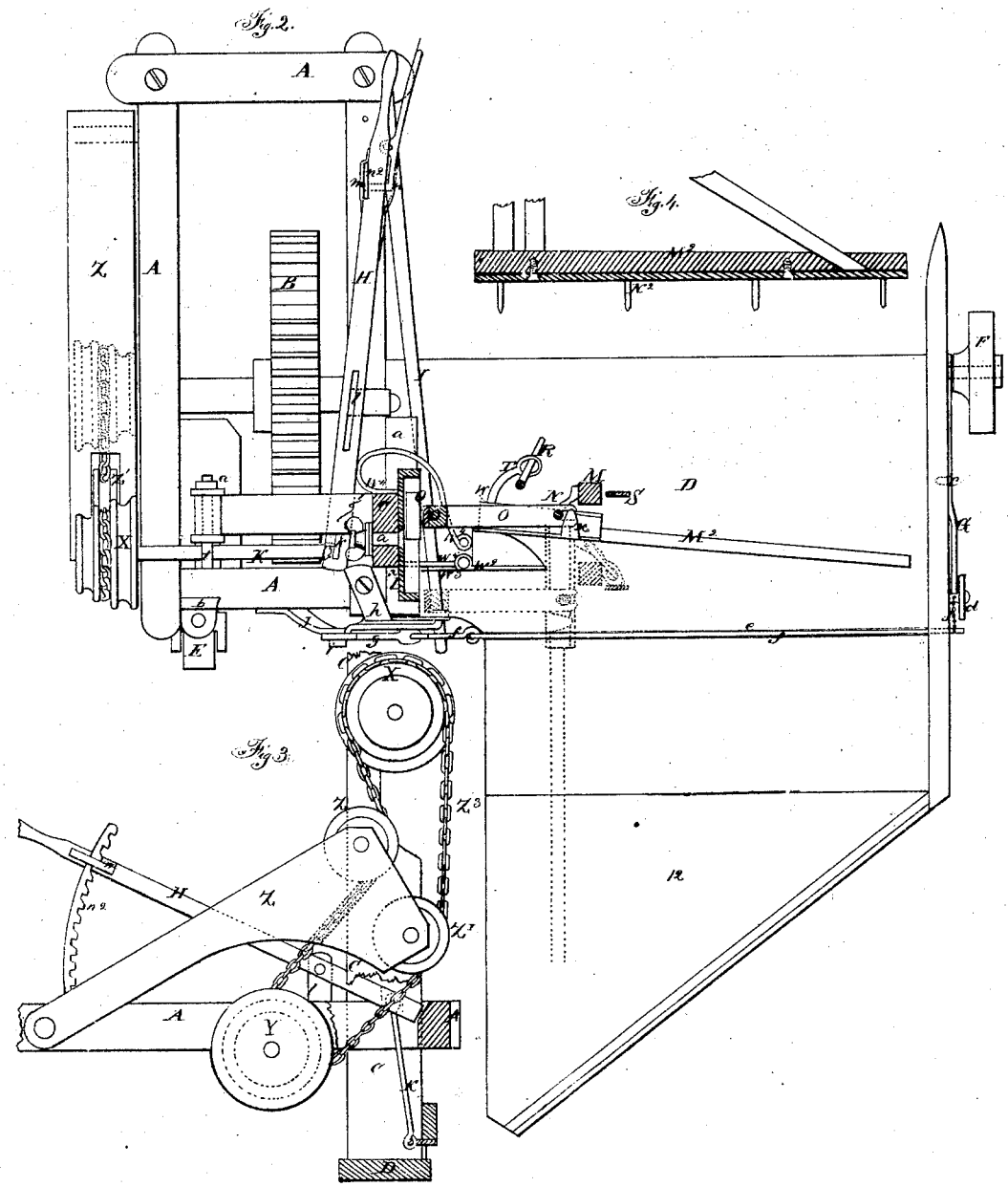

JESSE URMY, OF WILMINGTON, DELAWARE.

IMPROVEMENT IN HARVESTERS.

Specification forming part of Letters Patent No. 37,881, dated March 10, 1863.

*To all whom it may concern:*

Be it known that I, JESSE URMY, of Wilmington, in the county of Newcastle and State of Delaware, have invented a new and useful Improvement in Harvesters and Raking Attachment thereto; and I do hereby declare that the following is a full, clear, and exact description of the same, reference being had to the accompanying drawings, forming part of this specification, in which—

Figure 1 is a perspective view of my invention, a portion of one of the reel-arms, with its bars, being broken away. Fig. 2 is a horizontal section of the same. Fig. 3 is a partial side elevation and section of a portion of the invention. Fig. 4 is a section of the rake-head and a portion of one of the reel-bars.

Similar letters of reference in the several figures indicate corresponding parts.

My invention relates, first, to an ordinary reel, which is adapted to serve the twofold purpose of a reel and rake, and may at will be used simply as a reel or as a reel and rake.

It relates, second, to the adjustment of the reel-rake, cutting apparatus, and grain-side-supporting wheel by a lever all together.

It relates, third, to a speed-regulator for the reel-rake.

It relates, fourth, to a single-bar inner grain-guard, which has a horizontal and vertical adjustment through the agency of a slotted and swiveling device.

It also relates to several other details, which will be hereinafter described.

To enable others skilled in the art to make and use my invention, I will proceed to describe the same with reference to the drawings.

The draft-frame A is hung on the axle of the drive-wheel B, so as to vibrate or swing thereon. Down through guide-boxes $a\ a$ of the draft-frame two vertical reel-standards, C C', extend, and fasten into an inner extension of the platform D of the harvester. These standards slide freely up and down, and in sliding carry the platform and cutting apparatus with them, the latter maintaining their horizontal set with respect to the ground, although their height from the ground is changed by the adjustment of the standards. The rear end of the draft-frame is supported at any desired height by a caster-wheel, E, which is constructed with a slotted standard or hanger, $b$. The grain side of the platform is supported by a pendent wheel F, the ax this wheel being on a lever, G, which is fulcrumed on the outer divider, as at $c$. This lever has a series of adjusting-holes, by which the distance of the wheel F from the fulcrum may be shortened or lengthened. In order to adjust this wheel from the draft-frame simultaneously with the adjustment of the cutting apparatus, I attach a chain or cord, $f$, to the rear end of the lever G, pass this chain round a pulley, $d$, and down to and along in a groove, $e$, of the platform. This chain connects to a linked rod, $f'$, which in part occupies the groove, said rod being linked to an adjustable lever, $g$, which is linked to a perforated bracket, $h$, of the draft-frame, as shown, the fulcrum $i$ of the lever $g$ being supported on the cross-piece of the reel-standards by means of a standard, $j$, which has adjusting-holes.

In order to raise the reel-standards and the fulcrum $i$ of the lever $g$, a hand or foot lever, H, is connected to the standard C' by a link-rod, $k$. The fulcrum of this foot-lever is supported in a standard, $l$, of the draft-frame, said standard having a series of adjusting-holes. The front end of the lever has a loop, $m$, and a spring-stop, $n$, arranged upon it, so that it may be fitted to move up and down over a segment-rack, $n^2$, and also be retained by the stop $n$ at any desired elevation. By depressing the lever the reel-standards are elevated, and they, in rising, cause the lever $g$ to draw upon the lever G in such manner as to depress the wheel F, and thus elevate the platform or cutting apparatus. It is obvious that the wheel F might be depressed by the lever $g$ independent of the reel-standards; but in that case the connection between the levers H and $g$ must be destroyed and the fulcrum $i$ of the lever $g$ be located on the draft-frame.

To prevent the grain which is cut from falling against the reel-standard C' and under the draft-frame, a double-arm adjustable guard has been used. Means have also been devised for adjusting such armed guard; but I propose to use a single bar-guard, I, on the inner front corner of the draft-frame, and use but a single device, J, for its support and adjustment. This device is an angular plate or casting, which swivels on a screw-pin, $o$, and is perforated to receive a permanently-located pin, $p$, and is slotted at $q$ to receive and allow play to a pin, $r$, as represented. Now, it is evident that the horizontal swiveling of the plate J will allow a horizontal inward or outward adjustment of the bar I, while the curved slot $q$ will allow an upward or downward adjustment thereof. These two adjustments—viz., horizontal and vertical—are necessary accordingly as the grain may stand in the field.

The reel which I employ on the standards C C' has a horizontal shaft, K, hung in adjustable bearings $s\ t$. The bearing $s$ is adjustable in a slot, $s'$, of the standard C, and the bearing $t$ is adjustable in slots $t'\ t'\ t'$ of a cam, L, as shown. This cam also is adjustable by means of a screw, $u$, and a slot, $v$.

The reel-arms M, with bars M' $M^2$, are fastened to a hub, $M^6$, which is made fast on one end of the shaft K. Three of the bars, M' M' M', operate the same as ordinary reel-bars in a reel of this style, but the other bar, $M^2$, operates both as a reel-bar and a rake-head. In order to have the bar $M^2$ thus operate, I hang it to its arm by means of a loop-pivot, N, so that it may move in and out from the axis of the reel-shaft. The movement allowed should be great enough to allow it to come in just clearing relation to the platform—that is, when the rake-teeth N' are fastened to it, as shown. This bar thus arranged is also adapted to turn in the path of a horizontal circle to a position at right angles to the front edge of the finger-beam at the moment its arm stands nearly perpendicular under the reel-shaft. This motion and the inward and outward motion are produced as follows:

On the heel of the bar $M^2$ an extension, W, is formed, so as to strike a beveled hinge-trip, $W^2$, arranged on an angular bracket, $W^5$, of the standard C' of the reel, said trip having its hinge kept stiff on one side by a tongue, $W^3$, and yielding on the opposite side by a spring, $W^4$, this spring tending at all times to keep the trip in its acting position. The trip thus arranged and controlled trips the rake in a forward motion of the machine, but yields to the rake in a backward motion of the machine. Up from the top of the heel of the bar $M^2$ an angular slide, O, extends, and enters a guideway, P, of the reel-hub, as shown. This angular slide is forked at one end and fitted round the loop-pivot N of the rake-arm of the reel, and confined in one place by a stop, $x$, of the heel of bar $M^2$. The other portion of the slide has a friction-roller, Q, hung upon it. This roller enters a regulating-groove of the flanged cam L, and traverses (around) the same as the reel revolves. As the roller thus moves, the cam draws it and the rake-bar toward the axis of the reel-shaft, thus reducing the length of this portion of the reel to a length the same as the other portions, and rendering it available for reeling in the grain.

In order to guide and retain the rake part of the reel in proper position, a spring-rod, R, and an eye-bracket, T, are provided, one on a bracket of the hub portion of the reel, or thereabout, and the other on the heel of the rake-bar. The rod R enters the eye T and acts as a stay when grain is being reeled in; but its main office is to draw the rake back to its first or reeling position after it has been turned out of that position by the trip. The main dependence of the rake for support while reeling and raking parallel with the finger-beam is on the loop-pivot N and arm M, to which this pivot is attached. A spring, S, is provided to relieve the rake in its return from a position at right angles to the finger-beam. This spring also acts as a stop to the rake to keep it in proper position with respect to the straight or front portion of the platform. By means of the stop U the rake is stayed further through the loop-pivot N bearing against it while reeling. By removing the detachable bar or head which contains the rake-teeth, and removing the roller Q through the hole V, and then moving in the arm which carried the rake and fastening it to its bar M with a pin at $z$, the reel will operate in all its parts the same as an ordinary reel.

In order to adapt the reel-rake for discharging the cut grain from the platform rapidly or slowly, accordingly to the heavy or light growth or crop, I have arranged a nest of chain-pulleys on the reel-shaft, as indicated at X, and a similar nest of chain-pulleys are arranged on the drive-wheel axle, as indicated at Y; and in connection with these nests of pulleys I employ a pendent bar, Z, which carries on its loose end two grooved pulleys, Z' $Z'$, said pulleys bearing on the respective parts of an endless driving-chain, $Z^3$, as represented. By this arrangement I can shift the chain, so as to alter the speed of the rake-reel, and still always have the chain taut enough to drive the reel. The gravity of the pendent bar produces the tension on the chain and obviates the difficulty which would be occasioned from slack therein.

It is evident that the reel-shaft may be adjusted independent of the cam or regulator, also that this shaft may be canted slightly to suit any slight warp or twist in the platfrom.

It is also evident that the cam may be adjusted independent of the reel-shaft.

It is likewise evident that the rake-reel and the platform can be adjusted together independent of the draft-frame, and therefore the said parts may be adjusted while the machine is in motion without changing the angle of the cutting apparatus with respect to the standing grain.

When the rake is in position for raking straight from the cutting apparatus, it occupies the position shown in black in Fig. 2; but when it is raking at right angles to the cutting apparatus, it occupies the position shown in red in the same figure.

If it is desired to discharge the grain at the rear instead of at the side, the extension portion 12 of the platform is removed, and the tripper $W^2$ detached or turned round on its hinge out of the range of the raking-bar. No other change is necessary. There may be a catch provided to hold the trip after it has been thus adjusted.

What I claim as my invention, and desire to secure by Letters Patent, is—

1. The raking attachment or its equivalent as a substitute for one of the bars of an ordinary reel, when such attachment is capable of sliding in and out, and also of swinging round in the arc of a horizontal circle, substantially as and for the purpose set forth.

2. The loop-pivot N on one of the arms of the reel, for the purpose set forth.

3. The manner, substantially as described, of fitting the reel-standards C C' to the platform, draft-frame, and adjusting-lever H, for the purpose set forth.

4. The spring-rod R and eye-bracket T, in combination with a rake attachment, $M^2$, which operates substantially as described, for the purpose set forth.

5. The trip $W^2$, constructed and applied and operating substantially as and for the purpose set forth.

6. The manner of combining the slide O and rake-bar $M^2$, so that they move in and out together, while the rake-bar can turn independent of the slide, substantially as and for the purpose set forth.

7. Providing the holes V $z$ in the cam, reel-arm, and rake attachment, in combination with having the rake-teeth and friction-roller Q removable, for the purpose set forth, in the manner described.

8. The manner, substantially as described, of fitting the cam L and the reel-shaft bearings for operation together with a view of having them adjustable, as set forth.

9. In combination with the nests of pulleys for operating the rake-reel at varying speeds, the chain-tightener applied and operating substantially as described.

10. The single-bar grain-guard applied on the front end of the draft-frame through the agency of a swivel slotted device, J, substantially as and for the purpose set forth.

11. So applying the grain-side wheel to a lever-hanger which is connected to the reel-standards and to the draft-frame, substantially as described, that both the platform, with the cutting apparatus, and the reel, with the rake attachment, are elevated by the lever H, substantially as set forth.

JESSE URMY.

Witnesses:
THOS. D. GIBSON,
DANIEL KRORUSS.